United States Patent
Schulz

(10) Patent No.: US 7,433,448 B2
(45) Date of Patent: Oct. 7, 2008

(54) METHOD FOR THE PRODUCTION OF A CORRECTED X-RAY IMAGE DATA SET

(75) Inventor: Reiner Franz Schulz, Dormitz (DE)

(73) Assignee: Siemens Aktiengesellschaft, Munich (DE)

(*) Notice: Subject to any disclaimer, the term of this patent is extended or adjusted under 35 U.S.C. 154(b) by 128 days.

(21) Appl. No.: 10/564,078

(22) PCT Filed: Jul. 1, 2004

(86) PCT No.: PCT/EP2004/007166

§ 371 (c)(1),
(2), (4) Date: Jan. 9, 2006

(87) PCT Pub. No.: WO2005/008584

PCT Pub. Date: Jan. 27, 2005

(65) Prior Publication Data

US 2006/0177000 A1 Aug. 10, 2006

(30) Foreign Application Priority Data

Jul. 16, 2003 (DE) .................................. 103 32 344

(51) Int. Cl.
*H01J 35/00* (2006.01)
*G01N 23/04* (2006.01)

(52) U.S. Cl. ............................ 378/132; 378/62; 378/98; 600/407; 382/132; 382/128; 250/584; 250/586; 250/585; 250/236

(58) Field of Classification Search .................. 382/132; 378/62, 132; 600/407; 250/584–588, 236
See application file for complete search history.

(56) References Cited

U.S. PATENT DOCUMENTS 5,635,728 A * 6/1997 Cantu et al. .................. 250/584

(Continued)

FOREIGN PATENT DOCUMENTS

DE 197 19 954 A1 11/1998
DE WO9852070 * 11/1998

OTHER PUBLICATIONS

"The Physics of Computed Radiography," Rowlands, Phys. Med. Biol., vol. 47 (2002) R123-R166.

(Continued)

*Primary Examiner*—Andrew W. Johns
*Assistant Examiner*—Nancy Bitar
(74) *Attorney, Agent, or Firm*—Schiff Hardin LLP

(57) ABSTRACT

In a method for correcting pixels of an x-ray image data set, an x-ray exposure of a subject is acquired with an x-ray device that uses a storage film having a luminescent storage material layer serving as a radiation detector. The sensitivity of the luminescent storage material layer changes dependent on the accumulated x-ray radiation dose to which the storage layer has been exposed. After acquiring the x-ray exposure, the storage film is readout with a readout device and an x-ray image data set is generated that corresponds on a pixel-by-pixel basis with the x-ray exposure. Each pixel of the x-ray image data set is corrected with a correction value allocated to the corresponding pixel in the x-ray exposure, the correction value being adapted to the accumulated x-ray radiation dose to which the region of the storage film, containing the corresponding pixel, was exposed prior to acquiring the x-ray exposure.

4 Claims, 1 Drawing Sheet

U.S. PATENT DOCUMENTS

| | | | |
|---|---|---|---|
| 5,832,055 A * | 11/1998 | Dewaele | 378/62 |
| 6,490,339 B2 * | 12/2002 | Mitchell et al. | 378/62 |
| 6,510,197 B1 * | 1/2003 | Mitchell et al. | 378/62 |
| 6,518,564 B1 * | 2/2003 | Steiner et al. | 250/236 |
| 7,288,769 B2 * | 10/2007 | Fuchs et al. | 250/361 R |
| 2003/0042445 A1 * | 3/2003 | Mitchell et al. | 250/584 |
| 2003/0066972 A1 * | 4/2003 | Leblans et al. | 250/484.4 |
| 2003/0086522 A1 * | 5/2003 | Fuchs et al. | 378/198 |

OTHER PUBLICATIONS

"Digitale Detektorsysteme für die Projektionsradiographie," RöFo Fortschr. Röntgenstr., vol. 173 (2001), pp. 1137-1146.

"Langzeitergebnisse der Konstanzprüfung an einem Spechierfoliensystem," Krause et al., Jahrestagung Med. Physik Gmunden (2002).

* cited by examiner

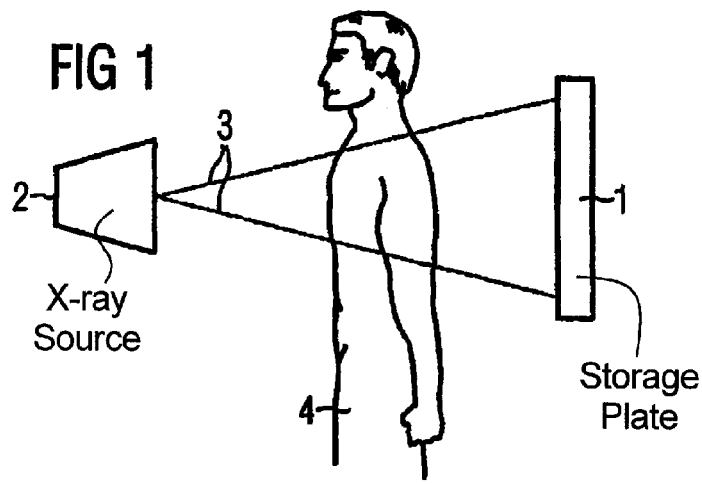
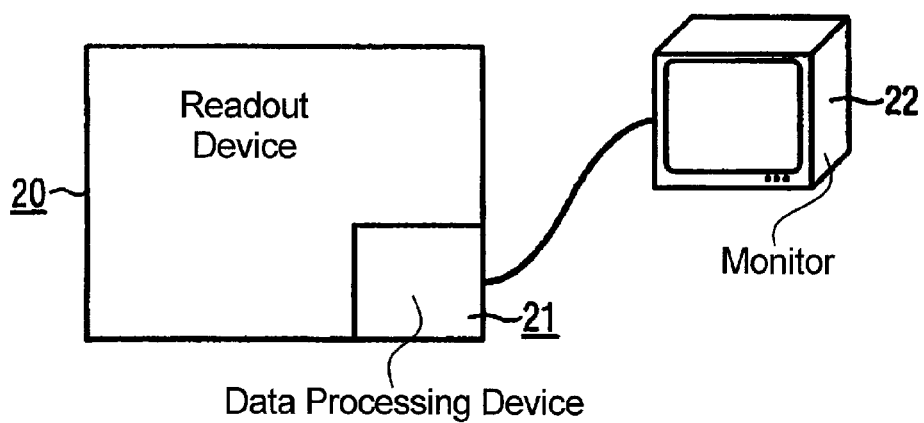

METHOD FOR THE PRODUCTION OF A CORRECTED X-RAY IMAGE DATA SET

BACKGROUND OF THE INVENTION

1. Field of the Invention

The invention concerns a method for correction of the pixels of an x-ray image data set.

2. Description of the Prior Art

X-ray apparatuses have a storage or image plate, for example, as an x-ray detector. This can be a substrate on which an x-ray storage luminophore layer is deposited. Such an image plate is typically arranged in a cassette. The x-ray radiation attenuated upon penetration through the examination subject interacts with the storage film as an x-ray intensity distribution and is absorbed thereby. Electrons in luminophore crystals are thereby converted into an excited, meta-stable state. The electrons located in an excited, meta-stable state are excited again by photo-simulation and consequently revert to their ground state. Light proportional to the x-ray intensity distribution is thereby emitted and detected with a readout device that is suitable and known to those skilled in the art from, for example, Schulz, Forschungsbericht Röntgenstrahlung 2001 (173), pages 1137-1146. A computer downstream from the readout device calculates an x-ray image data set from the read data.

The sensitivity of the storage film can be inhomogeneous, such that given exposure of the image plate with a homogeneous x-ray intensity distribution the corresponding x-ray image exhibits different grey values. In order to compensate the inhomogeneous sensitivity of the storage film, the individual pixels of the x-ray image data set can thus be corrected (and in particular normalized) with respective correction values associated with one of the individual pixels. The individual correction values can be experimentally determined, for example, for an individual image plate before its delivery and be stored once on a data memory of the readout device.

Given specific materials for the storage film, the sensitivity with the accumulated x-ray radiation to which the storage film is exposed can change. Such materials are, for example, doped alkali halogenide, for example KBr, Rbl, RbBr, CSBr doped with IN, Ga, TL and/or Eu. Since the x-ray radiation is attenuated by the examination subject, the applied x-ray doses of the individual sub-regions of the storage film differ. For example, the boundary regions of the storage film are thus normally exposed to a higher x-ray dose than regions near the middle of the storage film. In general, the accumulated x-ray doses of the individual sub-regions of the storage film thus differ. The sensitivities of the sub-regions of the storage film consequently also change differently with time, i.e. with the number of x-ray image data sets produced.

SUMMARY OF THE INVENTION

An object of the invention is to provide a method in which the changing sensitivities of the sub-regions of the storage film due to the accumulated x-ray doses of the storage film are accounted for in the correction.

This object is achieved in accordance with the invention by a method for correcting the pixels of an x-ray image data set, having the following method steps:

acquisition of an x-ray exposure of an examination subject with an x-ray apparatus that comprises a storage film as an x-ray detector, which storage film comprises a memory luminophore layer, the sensitivity of the memory luminophore layer changing with the accumulated x-ray dose to which the memory luminophore layer is exposed, readout of the storage film with a readout device after the x-ray exposure, generation, from the data determined via the readout process, of an x-ray image data set associated with the x-ray exposure, and correction of each pixel of the x-ray image data set with a correction value associated with the corresponding pixel of the x-ray exposure, with each individual correction value being adapted based on the accumulated x-ray dose to which the part of the storage film containing with the corresponding pixel of the x-ray image data set was exposed before the current x-ray exposure.

Since the sensitivity of the storage film changes differently with the accumulated x-ray dose, the correction value in accordance with the invention is adapted for each pixel of the x-ray image data set due to the accumulated x-ray dose to which sub-regions of the storage film were exposed. The change of the sensitivity of a specific memory luminophore can be experimentally determined from measurements. For a type of storage film or storage luminophore, the function $EB_{i,j}^m = f(D_{i,j}^m)$, thus the correction value for the m-th x-ray exposure, can thus be determined as a function of the accumulated x-ray dose $D_{i,j}^m$ in order to then correspondingly adapt the individual correction values. More or less complex functions (such as, for example, overlapping e-functions) result depending on the storage film material.

According to a variant of the invention, the m-th x-ray image data set (thus the current x-ray image data set to be generated) is corrected according to the following relation:

$$B_{i,j}^m = a * RB_{i,j}^m / EB_{i,j}^m.$$

a is a first scaling factor, $RB_{i,j}^m$ is the signal of the pixel i, j of the m-th x-ray image data set, $EB_{i,j}^m$ is the correction value for the pixel i, j of the m-th x-ray image data set and $B_{i,j}^m$ is the signal of the pixel i, j of the m-th corrected x-ray image data set. This type of correction is a normalization of the x-ray image data set.

In some cases such as, for example, for CsBr:Eu as a storage film material, the change of the sensitivity given typically applied x-ray doses is linear with the accumulated x-ray dose. According to a preferred embodiment of the inventive method, the accumulated x-ray dose $D_{i,j}^m$ for the sub-region of the storage film that is associated with the pixel i, j is therefore determined according to the following relation for the m-th x-ray image data set:

$$D_{i,j}^m = \sum_{n=1}^{m-1} b * B_{i,j}^n,$$

wherein b is a second scaling factor.

According to a preferred variant of the inventive method, the correction value $EB_{i,j}^m$ for the pixel i, j of the m-th x-ray image data set can thus be determined according to the following relation:

$$EB_{i,j}^m = EB_{i,j}^0 - s * \left( \sum_{n=1}^{m-1} b * B_{i,j}^n \right),$$

wherein s is a constant and $EB_{i,j}^{0}$ is the correction value that is associated with the storage film without applied x-ray dose. The correction values can also be smoothed by means of low-pass filtering for noise suppression. Furthermore, since the applied x-ray dose per exposure can be relatively small, it can be sufficient if the correction values are not updated given each exposure. Under the circumstances it can thus be sufficient to implement an updating after 10, 100 or even after 1000 exposures.

DESCRIPTION OF THE DRAWINGS

FIG. 1 schematically illustrates an x-ray apparatus with a storage plate.

FIG. 2 schematically illustrates a readout device for the storage plate of FIG. 1.

FIG. 3 graphically illustrates the change in the sensitivity of the storage plate of FIG. 1 as a function of the accumulated x-ray dose.

DESCRIPTION OF THE PREFERRED EMBODIMENTS

FIG. 1 shows an x-ray apparatus with a storage plate 1 embodying a storage film. An x-ray beam 3 whose edge rays are shown dashed in FIG. 1, emanates from the x-ray source 2 of the x-ray apparatus, and is attenuated upon penetration through an examination subject (a patient 4 in the case of the exemplary embodiment) and strikes the memory plate 1 as an x-ray intensity distribution. The x-ray intensity distribution is absorbed by the storage film which, in the case of the exemplary embodiment, has an x-ray luminophore layer composed of CsBr:Eu.

After the x-ray exposure, the storage plate 1 is evaluated with a readout device 20 schematically shown in FIG. 2 and, for example, known from Schulz, Forschungsbericht Röntgenstrahlung 2001 (173), pages 1137-1146. An incident surface of the memory plate 1 is homogeneously exposed with light by means of the readout device 20. The light consequently emitted by the storage plate 1 is detected and transduced into a matrix-shaped x-ray image data set by means of a data processing device 21 of the readout device 20. In order to compensate the sensitivities of different sub-regions of the storage film of the storage plate 1 due to different accumulated x-ray doses, in the case of the exemplary embodiment the individual pixels of the x-ray image data set are corrected according to the following:

$$B_{i,j}^{m} = a * RB_{i,j}^{m} / EB_{i,j}^{m},$$

wherein a is a scaling factor, $RB_{i,j}^{m}$ is the signal of the pixel i, j of the x-ray image data set, $EB_{i,j}^{m}$ is a correction value for the pixel i, j of the x-ray image data set and $B_{i,j}^{m}$ is the signal of the pixel i, j of the corrected x-ray image data set. The index m means that it is the m-th x-ray image data set or that (m-1) x-ray exposures were already produced with the memory plate 1 before the current x-ray exposure. In the exemplary embodiment, the x-ray image associated with the corrected x-ray image data set composed of the individual pixels $B_{i,j}^{m}$ can be viewed at a monitor 22 connected with the data processing device 21.

In the exemplary embodiment, the x-ray storage luminophore layer of the memory plate 1 changes its sensitivity linearly with the accumulated x-ray dose $D_{i,j}^{m}$ and in fact as is graphically shown in FIG. 3. In the case of the preferred exemplary embodiment, the individual correction values $EB_{i,j}^{m}$ associated with the corresponding pixels $RB_{i,j}^{m}$ of the x-ray image data set are therefore calculated according to the following relation:

$$EB_{i,j}^{m} = EB_{i,j}^{0} - s * \left( \sum_{n=1}^{m-1} b * B_{i,j}^{n} \right).$$

b and s are constants, s being the slope of the correction value as a function of the accumulated x-ray dose. $EB_{i,j}^{0}$ is the correction value of the x-ray memory luminophore layer without applied x-ray dose or, respectively, at a specific point in time at which the correction value was, for example, experimentally determined.

Although modifications and changes may be suggested by those skilled in the art, it is the invention of the inventor to embody within the patent warranted heron all changes and modifications as reasonably and properly come within the scope of his contribution to the art.

I claim as my invention:

1. A method for correcting pixels of an x-ray image data set, comprising the steps of:
    acquiring a current x-ray exposure of an examination subject with an x-ray apparatus using a reusable storage plate as an x-ray detector, said storage plate comprising a storage luminophore layer having a sensitivity that changes dependent on an accumulated x-ray dose to which said storage luminophore has been exposed in said current x-ray exposure and in said x-ray exposures using said storage plate preceding said current exposure;
    reading out said storage plate with a readout device after acquiring x-ray exposure;
    from the readout of said storage plate, generating an x-ray image data set corresponding to said x-ray exposure, said x-ray image data set comprising a plurality of data set pixels respectively corresponding to pixels of said current x-ray exposure; and
    correcting each of said data set pixels with a correction value associated with the pixel corresponding thereto in the current x-ray exposure, by adapting each correction value dependent on accumulated x-ray dosage to which a portion of the storage plate containing the pixel corresponding to the data set pixel was exposed in said current x-ray exposure and in said x-ray exposures using said storage plate preceding said current exposure.

2. A method as claimed in 1, comprising correcting pixels $RB_{i,j}^{m}$ of the m-th x-ray image data set according to the following:

$$B_{i,j}^{m} = a * RB_{i,j}^{m} / EB_{i,j}^{m},$$

wherein
    a is a first scaling factor,
    $RB_{i,j}^{m}$ is the signal of the pixel i, j of the m-th x-ray image data set,
    $EB_{i,j}^{m}$ is the correction value for the pixel i, j of the m-th x-ray image data set and
    $B_{i,j}^{m}$ is the signal of the pixel i, j of the m-th corrected x-ray image data set.

3. A method as claimed in claim 2, comprising determining the accumulated x-ray dose for a region of the storage plate that is associated with the pixel i, j of the x-ray image data set according to the following relation for the m-th x-ray image data set:

$$D_{i,j}^m = \sum_{n=1}^{m-1} b * B_{i,j}^n,$$

wherein b is a second scaling factor.

4. A method as claimed in claim 3, comprising determining the correction value $EB_{i,j}^m$ for the pixel i, j of the m-th x-ray image data set according to the following relation:

$$EB_{i,j}^m = EB_{i,j}^0 - s * \left( \sum_{n=1}^{m-1} b * B_{i,j}^n \right),$$

wherein s is a constant and $EB_{i,j}^0$ is the correction value that is associated with the storage film without applied x-ray dose.

* * * * *